3,562,124
Patented Feb. 9, 1971

3,562,124
COMPOSITION FOR CORROSION PROTECTION
Edward Leon, East Aurora, and Joseph A. Pawlak, Cheektowoga, N.Y., assignors to Hooker Chemical Corporation, Niagara Falls, N.Y., a corporation of New York
No Drawing. Filed Aug. 2, 1968, Ser. No. 749,615
Int. Cl. C23f 13/00
U.S. Cl. 204—148    15 Claims

ABSTRACT OF THE DISCLOSURE

A composition suitable for the protection of corrodible metallic surfaces which comprises a binder and a filler, the filler being present in an amount sufficient to impart corrosion resistant characteristics to the composition. The filler is constituted by a mixture of conductive metal particles which are more anodic than the metal of the metallic surface to be protected and comminuted refractory ferro alloys, the refractory ferro alloy being present in an amount sufficient to enhance the corrosion protection and effectiveness of the metal particles. Various binder materials, both organic and inorganic may be used and the filler is preferably a mixture of zinc particles and the refractory ferro alloy.

---

This invention relates to an improved composition for providing corrosion resistance and more particularly, it relates to a composition for providing improved corrosion protection for corrodible metallic surfaces.

Heretofore, various compositions have been proposed to provide protection for corrodible metallic surfaces. In recent years, considerable attention has been directed to compositions and systems for providing cathodic-anodic corrosion protection for metallic structures. Such systems and compositions are applicable for protecting underground pipes, storage tanks and the like, as well as metallic surfaces in contact with water, such as ship hulls, support structures for drilling rigs, docks, and the like.

In general, such systems or compositions utilize either an external source of electrical current which maintains the surface to be protected cathodic, or the corrosion protection composition itself forms an internal battery with the metal surface to be protected. In these latter systems, the coatings contain metal particles which are more anodic than the metal surface to be protected, and thus act as sacrificial anodes. In the most common coatings of this latter type, the composition is constituted by a binder and a filler. The binder may be any suitable organic or inorganic binder material and the filler is constituted by conductive metal particles which are more anodic than the metal which is to be protected. Most frequently, the metal particles of such coatings are zinc particles.

While such coating compositions have recently been used to a considerable extent, it has been found that the metal particles, such as zinc dust or powder, add greatly to the cost of such composition. Moreover, it is frequently necessary to utilize appreciab!. … of this relatively expensive metallic filler, e.g. 80% or more by weight of the total composition in order to provide the requisite corrosion protection of the metal surface.

It is, therefore, an object of the present invention to provide a corrosion protective composition for corrodible metal surfaces, which composition provides corrosion protection at least equivalent to that provided by the present zinc-rich coatings.

A further object of the present invention is to provide an improved corrosion protective composition for corrodible metallic surfaces, which composition is less expensive than the presently used zinc-rich coating material.

These and other objects of the present invention will become apparent to those skilled in the art from the description of the invention which follows.

Pursuant to the above objects, the present invention includes a composition suitable for the protection of corrodible metallic surfaces which comprises a binder and a filler, the filler being present in an amount sufficient to import corrosion resistant characteristics to the composition and being constituted by a mixture of conductive metal particles more anodic than the metal of the metallic surface to be protected and a comminuted refractory ferro alloy, the refractory ferro alloy being present in an amount sufficient to enhance the corrosion protection effectiveness of the metal particles. With this composition, it has been found that by replacing a portion of the zinc particles in the conventional zinc-rich coating composition with a comminuted refractory ferro alloy, the corrosion protection obtained is at least equal to that when using all zinc, and frequently is improved. Moreover, it has also been found that in some instances, the total amount of filler in the composition, i.e., zinc plus refractory ferro alloy, may be less than the total amount of zinc required in the previously used zinc-rich coating, while still obtaining superior corrosion protection.

More specifically, in the practice of the present invention, the composition for protecting corrodible metallic surfaces contains the binder in an amount which is desirably within the range of about 3 to 70% by weight of the composition and preferably in an amount which is within the range of about 3 to 50% by weight of the composition. Various binder materials, both organic and inorganic may be used, the choice of a particular binder being dependent upon the characteristics which are desired for the protective coatings in each particular instance. Thus, for example, the binder used may include various synthetic resins, such as epoxies, chlorinated rubber, polystyrene, polyvinyl butyral resins, polyvinyl acetate resins, silicones, and the like. Additionally, inorganic binders may also be used, including those obtained from silicates, such as the alkali metal silicates such as sodium silicates, phosphates, hydrolyzed ethyl silicates, butyl titanates and the like. It is believed that the use of these and other similar binder materials will be apparent to those skilled in the art so that the particular binder suitable in each instance can be selected for use in the composition of the present invention.

In addition to the binder, the present composition also contains a filler, which filler is present in an amount sufficient to impart corrosion resistant characteristics to the composition. Typically, the filler is present in an amount of at least 20 to 95% by weight of the total composition, with amounts within the range of about ⸻ to 93% by weight of the composition being preferred. As has been noted hereinabove, because of the widely differing characteristics of the binder materials which may be used, the amount of filler used in each instance, in order to impart corrosion protective properties to the composition, may in some instances, be more or less than the typical amounts which have been indicated hereinabove. It is believed, however, that those in the art will readily be able to determine the amount of filler required in each instance to impart the desired corrosion protection characteristics to the composition.

The filler portion of the present composition is constituted by conductive metal particles, the metal of which is more anodic than the metal of the substrate which is to be protected, and comminuted particles of a refractory ferro alloy. The comminuted ferro alloy is present in the filler composition in an amount which is at least sufficient to enhance the corrosion protection effectiveness of the other conductive metal particles in the composition, and is desirably present in an amount of at least about 3% by weight of the filler. Preferably, the comminuted refractory ferro alloy is present in an amount within the range of about 10 to 85% by weight of the filler portion of the present composition.

The conductive metal particles which are more anodic than the metal of the substrate to be protected may be particles of the various suitable metals, the specific choice in each instance depending upon the metal of the substrate. In many instances, it has been found that zinc particles produce excellent results on iron and steel and for this reason, such particles are generally preferred. Other metal particles may be used, however, such as aluminum, magnesium, and the like, as well as particles of metal alloys, so long as these metal particles are electrically conductive and more anodic than the metal of the substrate which is to be protected.

The comminuted refractory ferro alloy, which constitutes a portion of the filler of the present composition, may be any of the various refractory ferro alloys, as are known to those in the art. Such refractory ferro alloys include ferromanganese, ferromolybdenum, ferrosilicon, ferrochrome, ferrovanadium, ferrozirconium, ferrotitanium, ferrotungsten, ferroboron, ferrophosphorous, iron carbide, and the like. Additionally, the refractory ferro alloys containing more than two metallic elements, such as magnesium-ferrosilicon, ferrochrome-silicon, Siminal (containing about 20% each of silicon, magnesium and aluminum with the balance being iron), and the like, may also be used. The refractory ferro alloys which are suitable for use in the composition of the present invention are those materials which are electrically conductive, brittle, and which are substantially unreactive in water, dilute acidic or alkaline solutions. Of the various refractory ferro alloys indicated hereinabove, in many instances, the preferred material has been found to be ferro-phosphorus. This refractory ferro alloy is an iron phosphide composition, generally containing from about 20 to 28% by weight of phosphorus and corresponding to a mixture of $Fe_2P$ and $FeP$. The principal impurities occuring in ferrophosphorus are silicon, vanadium, chromium, nickel and manganese, as well as trace amounts of other elements. Of these, silicon and manganese are the major impurities, typically being present in amounts up to about 7% by weight. Ferrophosphorus is a byproduct in the commercial manufacture of elemental phosphorus by the electric furnace reduction of phosphate ores, the iron present in the phosphate ores forming the iron phosphide material.

As has been noted hereinabove, the metallic particles and the comminuted refractory ferro alloy which constitute the filler portion of the composition of the present invention are in finely divided form. Desirably, the metal particles, such as zinc, have an average size within the range of about 2 to 10 microns and preferably within the range of about 5 to 7 microns. Desirably, the particles of the comminuted refractory ferro alloy such as ferro phosphorus, have an average size within the range of about 1 to 10 microns, and preferably are within the range of about 1 to 5 microns.

The conductive metal particles and the refractory ferro alloy may be subjected to any suitable crushing and/or grinding operation in order to obtain products having particle sizes within the desired ranges as have been indicated hereinabove. In the case of the refractory ferro alloys, it has frequently been found that improved results, in terms of enhancement of the corrosion protection, are obtained by cleaning the refractory ferro alloy after the crushing and/or grinding operation. This cleaning is desirably effected by washing the ground refractory ferro alloy, such as ferro phosphorus, with an aqueous acidic solution, preferably an aqueous solution of hydrochloric acid. Typically, the hydrochloric acid solution used has a concentration within the range of about 1.0% to 12.0% and the ground refractory ferro alloy is washed with this solution for a period sufficient to form an activated surface on the refractory ferro alloy. In general, washing times of from about 1 to 4 hours are typical. It is to be appreciated, of course, that the washing time will vary in each instance and, depending upon the amount and degree of contact which can be obtained with the ferro alloy particles, may be much less than those typical times given hereinabove. Thereafter, the refractory ferro alloy may be rinsed with water to remove any residual acid and then dried before being admixed with the conductive metal particles to form the filler portion of the present composition.

Although it is not known for certain, it is believed that in the grinding operation to attain the desired particle size of the refractory ferro alloy, the surface of the refractory ferro alloy particles becomes passivated in some manner. The above described acid washing of the ground particles thus serves to reactivate the surfaces of the ferro alloy particles so that the maximum benefit may be obtained from their inclusion in the compositions of the present invention.

The coating compositions of the present invention may be formulated by admixing the binder and resin components, in the proportions as have been set forth hereinabove, using any suitable mixing techniques. If desired, the metal particles and the comminuted refractory ferro alloy may be added separately to the binder material or they may be premixed in the desired proportions to form the filler component which may then be admixed with the binder.

Depending upon the particular binder which is used, the composition may also contain suitable solvents, curing agents, plasticizers, and the like. Exemplary of suitable solvents which may be used are: xylene, toluene, mineral spirits, methanol, ethanol, butanol, isopropanol, ethyl butyl ketone, methylisobutylketone, ethyleneglycol monobutyl ether, ethylene glycol monoethyl ether, ethylene glycol monoethyl ether acetate, ethyl acetate, butyl acetate, and the like.

Exemplary of suitable curing agents are the following: cobalt, lead, manganese, driers such as naphthanates, polyamines, such as triethylenetetramine, polyamide resins such as those prepared from a fatty dibasic acid and ethylene diamine, phosphoric acid, oxalic acid and the like.

Examplary of suitable plasticizers which may be used are the following: diocyl sebacate, dioctyl phthalate, dioctyl adipate, diethylene glycol dibenzoate, castor oil, methyl recenoleate, polyesters, epoxidized soybean oil, epoxy esters tricresyl phosphate, chlorinated biphenyls, chlorinated polyphenyls, chlorinated paraffin and the like.

Typically, the solvents may be present in amounts within the range of about 5 to 60% by weight of the composition while the curing agents and plasticizers may each be present in amounts up to about 70% by weight of the composition respectively.

It is to be appreciated, of course, that the specific amounts of these components, as well as the types used, will depend in each instance upon the particular binder as well as the ultimate characteristics desired for the particular coating composition and its use.

The thus-formulated composition may then be applied to the metal substrate to be protected using any suitable techniques, as for example, by spraying, brushing, immersion, flowing or the like. Typically, the compositions are applied so as to produce a protective coating or film having a thickness within the range of about 0.5 to 5.0 mils, although coating thicknesses which are outside of these typical ranges may also be used, depending upon the particular conditions of application and intended use in each instance. Desirably, this film will be made up of the binder in an amount of about 3–70% by weight, and preferably about 7–50% by weight and the filler in an amount of about 30–97% by weight, and preferably about 50–93% by weight. Following the application of the coating to the metal substrate to be protected, drying and/or curing of the coating is effected. The type and extent of the drying or curing will vary in each instance, depending upon the specific nature of the binder material which is used in the composition. Thus, in some instances, heating may be utilized to effect drying or cure of the coating while in other instances, simple air drying or curing may be sufficient. The thus-formed coatings are found to provide excellent corrosion protection to the metal substrates to which they are applied. In this regard, it has been found that these coatings are useful in providing protection on a variety of metal substrates, including substrates of ferrous metal, copper, and the like. As has been previously noted, depending upon the particular metal substrate to be protected, the conductive metal particles in the filler portion of the coating composition will be changed, so as to utilize particles which are sufficiently more anodic than the metal substrate so as to provide the desired protection.

In this regard, it is to be noted that the protective coatings of the present invention act anodically to provide the corrosion protection for the metal substrates to which they are applied. Moreover, it has been found that the presence of the comminuted refractory ferro alloy, such as ferro phosphorus, in these compositions acts to enhance the anodic corrosion protection afforded by the conductive metal particles of the composition. Although the exact mechanism by which this enhancement is effected is not known, it is believed that in some manner, the comminuted refractory ferro alloy provides a surface on which the cathodic reaction, which takes place concurrently with the sacrificial anodic action of the conductive metal particles, can more easily proceed. Thus, the coatings of the present invention are found to provide excellent corrosion protection of the anodic type for numerous metal substrates in contact with corrosive media such as underground pipelines, ship's hulls, off shore drilling platforms, and the like.

In order that those skilled in the art may better understand the present invention and the manner in which it may be practiced, the following specific examples are given. In these examples, unless otherwise indicated, temperatures are in degrees centigrade and parts and percents are by weight. It is to be appreciated, however, that these examples are merely exemplary of the present invention and are not to be taken as a limitation thereof.

EXAMPLE 1

A coating composition was formed by admixing the following components in the amounts indicated:

| Components: | Parts by wt. |
|---|---|
| Zinc dust | 371.6 |
| Ferro phosphorus (23.4% P) | 356.9 |
| Magnesium montmorilonite (thickening agent) | 7.5 |
| Methanol | 4.0 |
| 50% solvent solution* of poly-bisphenol-A, epoxide 500 epoxide equivalent | 63.6 |
| Xylene | 53.7 |
| Butanol | 45.5 |
| Methylisobutylketone | 7.63 |

* Solvent composition contains: 49.97% xylene, 7.63% methylisobutylketone, 42.40% butanol.

200 parts of the above coating composition was mixed with 5.3 parts of a curing solution which contained 200 parts of a dimer acid-ethylene diamine polyamide (230–246 amine value) and 84.9 parts of xylene.

Standard 3 inch by 5 inch steel panels were coated with the above formulation and then cured at room temperature at a 50% relative humidity for several days. Thereafter, the panels were scored by cross-hatching and immersed in a 1% sodium chloride solution. After four days, the film on the panels was intact, without rust.

EXAMPLE 2

By way of comparison, a coating composition was prepared by admixing the following components in the amounts indicated:

| Components: | Parts by weight |
|---|---|
| Zinc dust | 372 |
| Barium sulfate | 220 |
| Magnesium montmorillonite (thickening agent) | 7.5 |
| Methanol | 4.0 |
| Poly-bisphenol-A-epoxide (450–525 epoxide equivalent) | 78.2 |
| Xylene | 86.6 |
| Butanol | 72.6 |
| Methylisobutylketone | 13.0 |

100 parts of the above composition was admixed with 7.1 parts of the curing solution as described in Example 1.

Standard 3 inch by 5 inch steel panels were then coated with this composition, cured and tested as in Example 1. After four days immersion in a 1% sodium chloride solution, light to moderate rusting in score lines and medium to medium dense number 6 blistering (ASTM-D714-56) was observed throughout the film on the panels.

EXAMPLE 3

A coating composition was prepared containing the following components in the amounts indicated:

| Components: | Parts by weight |
|---|---|
| Zinc | 112.5 |
| Ferrophosphorus | 37.5 |
| Hydrolyzed ethyl silicate solution in butyl Cellosolve and ethanol (38% solids) | 385 |

This solution was applied to steel panels by spraying, as in Example 1. The resulting coating was air dried over night and the coated panels were tested in a five percent sodium chloride solution, as in Example 1. After four days immersion, the film on the panels was intact without rust.

EXAMPLE 4

The procedure of Example 3 was repeated with the exception that the coating composition used contained the following components in the amounts indicated:

| Components: | Parts by weight |
|---|---|
| Zinc | 604 |
| Ferrophosphorus | 257 |
| Dioctyl phthalate | 2.97 |
| Highflash naphtha | 35 |
| Xylene | 48 |
| Turpentine | 8 |
| Chlorinated rubber (20 centipoises at 25 degrees centigrade in 20% toluene solution) | 28.2 |
| Chlorinated biphenyl (67% by weight chlorine) | 19.84 |

Panels were coated and tested as in Example 3, in three percent sodium chloride solution and substantially the same results were obtained.

EXAMPLE 5

The procedure of Example 3 was repeated except the composition contained 186 parts of the zinc, 186 parts of the ferrophosphorus and 160 parts of the hydrolyzed ethyl silicate. After coating the panels and testing as in Example 3, similar results were obtained.

EXAMPLE 6

Coating compositions were prepared containing the following components in the amounts indicated:

| Component | Parts by weight | |
|---|---|---|
| | A | B |
| Zinc dust | 1123.4 | 730.7 |
| Ferrophosphorus (24.2% P) | | 313.0 |
| Suspending agent | 2.1 | 2.0 |
| 46.2% solvent¹ solution of polybisphenol-A-epoxide (450–550 epoxide equivalent) | 141.2 | 153.9 |
| Solvent¹ | 73.8 | 56.3 |
| Curing solution² | 49.4 | 53.5 |

¹ Solvent=50/50 parts by weight of ethylene glycol monobutylether and xylene.
² Curing solution=71.6% by weight of a dimer acid-ethylene diamine polyamide (230–246 amine value) in xylene.

Standard 3 inch by 5 inch steel panels were coated with the above formulations. Formulation A was air cured for one-half hour and finally heat cured for one-half hour at 150–152.8 degrees centigrade. Formulation B was air cured for 25–40 minutes and heat cured for one-half hour at 148–152 degrees centigrade. The panels were then subjected to a salt fog exposure. Panels coated with Formulation A showed moderate to severe rusting and medium dense to dense #6 blistering after a 171⅔ hour salt fog exposure while panels coated with Formulation B showed no rusting and medium to medium dense #8 blistering in the same period.

EXAMPLE 7

Coating compositions were prepared containing 150 parts by weight zinc, 220 parts by weight of the hydrolyzed ethyl silicate of Example 3 and 50 parts by weight of various ferro alloys as follows:

Composition:              Ferro alloy
  A  ----------------------------- Iron carbide.
  B  ----------------------------- Ferro manganese.
  C  ----------------------------- Ferro silicon.

Each of these compositions was applied to the panels and tested as in Example 3 and similar results were obtained.

It is to be appreciated that in some instances the refractory ferro alloys of the present compositions may be replaced by other, similar refractory materials which are electrically conductive, brittle, and substantially nonreactive in water, dilute alkaline or dilute acidic solutions. Typical of such materials are the carbides, nitrides, borides and silicides of titanium, zirconium, vanadium, niobium, tantalum, chromium, molybdenum, tungsten, thorium and hafnium, silicon carbides, as well as phosphides of boron, cadmium, calcium, chromium, cobalt, manganese, molybdenum, nickel, tantalum, thorium, tin, titanium, tungsten, vanadium, zirconium, and the like.

While there have been described various embodiments of the invention, the compositions and methods described are not intended to be understood as limiting the scope of the invention as changes therewithin are possible and it is intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A composition suitable for the protection of corrodible metallic surfaces which comprises a binder and a filler, the filler being present in an amount sufficient to impart corrosion resistant characteristics to the composition and being constituted by a mixture of conductive metal particles more anodic than the metal of the metallic surface to be protected and a comminuted refractory ferroalloy selected from ferromanganese, ferromolybdenum, ferrosilicon, ferrochrome, ferrovanadium, ferrozirconium, ferrotitanium, ferrotungsten, ferroboron, ferrophosphorus and iron carbide, the refractory ferro-alloy being present in an amount sufficient to enhance the corrosion protection effectiveness of the metal particles and further being characterized by being electrically conductive, brittle, and substantially unreactive in water, dilute acidic or alkaline solutions.

2. The composition as claimed in claim 1 wherein the binder constitutes from about 3 to 70 percent by weight of the composition and the filler is present in an amount within the range of about 20 to 95 percent by weight of the composition.

3. The composition as claimed in claim 2 wherein the refractory ferroalloy is present in an amount of from at least about 3 percent by weight of the filler.

4. The composition as claimed in claim 3 wherein the conductive metal particles in the filler are zinc particles, the comminuted refractory ferroalloy is ferrophosphorus, and ferrophosphorus is present in an amount of from about 10 to 75 percent by weight of the filler.

5. The composition as claimed in claim 4 wherein the ferrophosphorus has an average particle size within the range of about 1 to 10 microns and the surface of the ferrophosphorus particles are activated by acid washing.

6. A method of forming a corrosion protective coating on a metal substrate which comprises contacting the substrate with the composition as claimed in claim 2 and forming a coating of said composition on the substrate thus-contacted.

7. A method of forming a corrosion protective coating on a metal substrate which comprises contacting the substrate with the composition as claimed in claim 3 and forming a coating of said composition on the substrate thus-contacted.

8. A method of forming a corrosion protective coating on a metal substrate which comprises contacting the substrate with the composition as claimed in claim 4 and forming a coating of said composition on the substrate thus-contacted.

9. The method of forming a corrosion protective coating on the metal substrate which comprises contacting the substrate with the composition as claimed in claim 5 and forming a coating of said composition on the substrate thus-contacted.

10. An article having a metallic surface coated with a coating of the composition as claimed in claim 1.

11. The article as claimed in claim 10 wherein the coating contains the binder in an amount of from about 3 to 70 percent by weight and the filler in an amount of from about 30 to 97 percent by weight.

12. The article as claimed in claim 11 wherein the binder is present in an amount of from about 7 to 50 percent by weight and the filler is present in an amount of from about 50 to 93 percent by weight.

13. The article as claimed in claim 12 wherein the conductive metal particles in the filler are zinc particles, the comminuted ferroalloy is ferrophosphorus, and the ferrophosphorus is present in the filler in an amount of at least about 3 percent by weight of the filler.

14. The article as claimed in claim 13 wherein the ferrophosphorus is present in the filler in an amount of from about 10 to 75 percent by weight of the filler, the ferrophosphorus has an average particle size of from about 1 to 10 microns and the surface of the ferrophosphorus particles have been activated by acid washing.

15. A method of forming a corrosion protective coating on a metal substrate which comprises contacting the metal substrate with the composition as claimed in claim 1 and forming a coating of said composition on the substrate thus-contacted.

(References on following page)

References Cited

UNITED STATES PATENTS

| | | | |
|---|---|---|---|
| 2,117,191 | 5/1938 | McCauley | 75—123D |
| 2,171,306 | 8/1939 | Ireland | 106—84M |
| 2,576,845 | 11/1951 | McDonald | 106—84M |
| 3,354,063 | 11/1967 | Shutt | 204—197 |
| 3,356,515 | 12/1967 | McClothlin | 106—84M |
| 3,381,113 | 4/1968 | Jacques et al. | 75—132 |

TA-HSUNG TUNG, Primary Examiner

U.S. Cl. X.R.

106—84; 204—197